US012755211B2

(12) United States Patent
Manamohan et al.

(10) Patent No.: US 12,755,211 B2
(45) Date of Patent: Oct. 6, 2026

(54) SYSTEM AND METHOD OF TRAINING HETEROGENOUS MODELS USING STACKED ENSEMBLES ON DECENTRALIZED DATA

(71) Applicant: HEWLETT PACKARD ENTERPRISE DEVELOPMENT LP, Houston, TX (US)

(72) Inventors: Sathyanarayanan Manamohan, Bangalore (IN); Krishnaprasad Lingadahalli Shastry, Bangalore (IN); Sorin-Cristian Cheran, Grenoble (FR)

(73) Assignee: Hewlett Packard Enterprise Development LP, Spring, TX (US)

(*) Notice: Subject to any disclaimer, the term of this patent is extended or adjusted under 35 U.S.C. 154(b) by 1109 days.

(21) Appl. No.: 17/515,438

(22) Filed: Oct. 30, 2021

(65) Prior Publication Data

US 2023/0138780 A1 May 4, 2023

(51) Int. Cl.

| | |
|---|---|
| ***G06N 20/20*** | (2019.01) |
| ***G06F 16/27*** | (2019.01) |
| ***G06N 3/04*** | (2023.01) |
| ***G06N 3/045*** | (2023.01) |

(52) U.S. Cl.

CPC ............ *G06N 20/20* (2019.01); *G06F 16/27* (2019.01); *G06N 3/045* (2023.01); *G06N 3/04* (2013.01)

(58) Field of Classification Search

CPC ........ G06N 20/20; G06N 3/044; G06N 3/045; G06N 3/084; G06N 3/04; G06F 8/45

See application file for complete search history.

(56) References Cited

U.S. PATENT DOCUMENTS

| | | | | |
|---|---|---|---|---|
| 6,223,281 | B1 * | 4/2001 | Bird | G06F 8/45 712/241 |
| 8,244,652 | B2 | 8/2012 | Menahem et al. | |
| 8,250,013 | B2 | 8/2012 | Fung et al. | |
| 9,501,749 | B1 | 11/2016 | Ilya | |

(Continued)

FOREIGN PATENT DOCUMENTS

| | | | |
|---|---|---|---|
| CA | 3085092 | A1 | 12/2020 |
| WO | 2019/222742 | A1 | 11/2019 |
| WO | 2020/247949 | A1 | 12/2020 |

OTHER PUBLICATIONS

Ramalingam Pari, Maheshwari Sandhya, and Sharmila Sankar; A Multitier Stacked Ensemble Algorithm for Improving Classification Accuracy; IEEE (Year: 2020).*

(Continued)

*Primary Examiner* — Abdullah Al Kawsar

(74) *Attorney, Agent, or Firm* — Sheppard Mullin Richter & Hampton LLP

(57) ABSTRACT

Systems and methods are provided for machine learning in a distributed, privacy-preserving manner. Particularly, the decentralized system can share machine learning models in a protected manner by training a first sub-model with a first local data set at a first node and obfuscating the trained first sub-model as a first obfuscated sub-model. The model may be shared with a second node, that can construct a local instance of a stacked ensemble comprising the first obfuscated sub-model and a trainable parametric layer and train the local instance of the stacked ensemble with a second local data set accessible locally at the second node.

20 Claims, 6 Drawing Sheets

(56) References Cited

U.S. PATENT DOCUMENTS

| | | | | |
|---|---|---|---|---|
| 11,605,013 | B2 | 3/2023 | Manamohan et al. | |
| 2014/0279741 | A1* | 9/2014 | Sow | G06N 20/00 706/12 |
| 2019/0095756 | A1 | 3/2019 | Agrawal et al. | |
| 2019/0101908 | A1* | 4/2019 | Park | G05B 23/0254 |
| 2019/0251469 | A1 | 8/2019 | Wagstaff et al. | |
| 2020/0113505 | A1 | 4/2020 | Clingman et al. | |
| 2020/0143267 | A1* | 5/2020 | Gidney | H04L 9/3239 |
| 2020/0242400 | A1* | 7/2020 | Perkins | G06V 10/776 |
| 2020/0293887 | A1 | 9/2020 | De Brouwer et al. | |
| 2021/0067339 | A1* | 3/2021 | Schiatti | G06F 16/27 |
| 2021/0117869 | A1* | 4/2021 | Plumbley | G06F 18/217 |
| 2021/0142224 | A1* | 5/2021 | McCourt | G06F 18/23 |

OTHER PUBLICATIONS

Vaidotas Drungilas; Towards Blockchain-Based Federated Machine Learning: Smart Contract for Model Inference; Applied Science (Year: 2021).*

Shreya Biswas; Prediction of COVID-19 from Chest CT Images Using an Ensemble of Deep Learning Models; Applied Science (Year: 2021).*

Nonita Sharma; Employing stacked ensemble approach for time series forecasting; Springer (Year: 2021).*

* cited by examiner

SYSTEM AND METHOD OF TRAINING HETEROGENOUS MODELS USING STACKED ENSEMBLES ON DECENTRALIZED DATA

BACKGROUND

Machine learning (ML) generally involves a computer-implemented process that builds a model using sample data (e.g., training data) in order to make predictions or decisions without being explicitly programmed to do so. ML processes are used in a wide variety of applications, particularly where it is difficult or unfeasible to develop conventional algorithms to perform various computing tasks.

A particular type of ML process, called supervised machine learning, offers state-of-the-art classification of received data for a variety of classification tasks. The process for setting up the supervised machine learning generally involves (a) centralizing a large data repository, (b) acquiring a ground truth for these data, and (c) employing the ground truth to train the ML model for the classification task. However, this framework poses significant practical challenges, including data privacy and security challenges that come with creating a large central data repository for training the ML models.

BRIEF DESCRIPTION OF THE DRAWINGS

The present disclosure, in accordance with one or more various examples, is described in detail with reference to the following figures. The figures are provided for purposes of illustration only and merely depict typical or examples.

Figure 1:
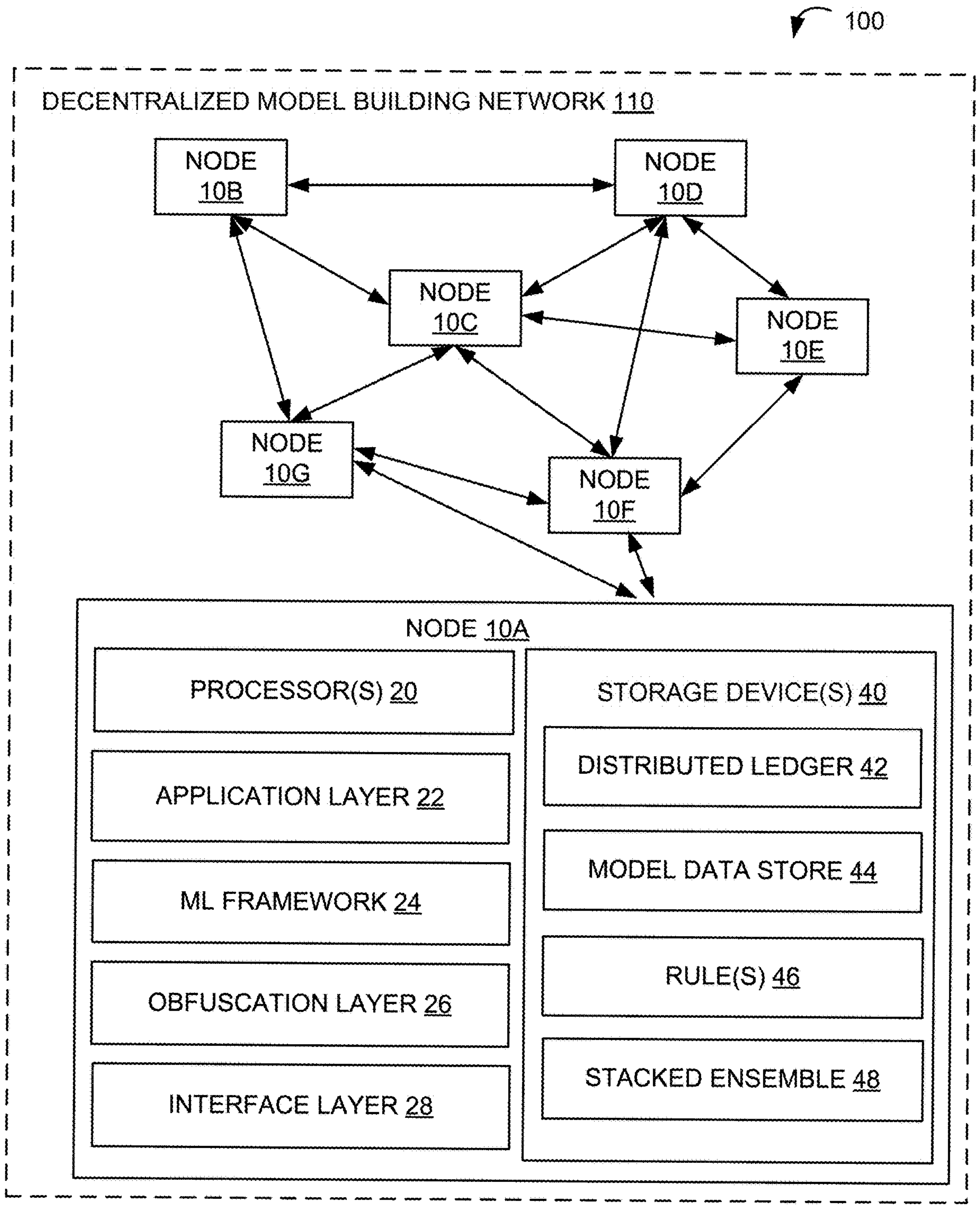
FIG. 1 illustrates an example system of decentralized ML model-building using blockchain, according to an example implementation of the disclosure.

The figures are not exhaustive and do not limit the present disclosure to the precise form disclosed.

DETAILED DESCRIPTION

Federated learning or collaborative learning is a type of ML process that trains the ML model across multiple decentralized devices holding local data samples. In some examples, the decentralized devices may not exchange their data sets. This approach stands in contrast to traditional centralized ML techniques where all local datasets are uploaded to one server, as well as to more classical decentralized approaches which often assume that local data samples are identically distributed. Particularly, federated learning enables multiple devices to build a common, robust ML model without sharing data, thus allowing to address critical issues such as data privacy, data security, data access rights, and access to heterogeneous data. Its applications are spread over a number of industries including defense, telecommunications, IoT, and pharmaceutics.

However, privacy concerns remain in federated learning. For example, the sources that provide data for federated learning may be unreliable. The sources may be vulnerable to network issues since they commonly rely on less powerful communication media (i.e. Wi-Fi) or battery-powered systems (i.e. smartphones and "Internet of Things" (or "IoT") devices) compared to traditional centralized ML where nodes are typically data centers that have powerful computational capabilities and are connected to one another with fast networks.

Additionally, federated learning is generally limited to building a common, robust ML model without the sharing data. It is currently not possible for participants to bring their own ML models with different architectures (but with the same data input vectors and ML model output vector attributes), in order to learn in a collaborative manner. For example, the ML models themselves can represent a corpus of knowledge developed by domain experts at each of the distributed nodes. The values of hyper parameters in each ML model, the architecture of the ML model itself, and other weights/biases of the ML model are valuable assets that are generally not easily shared in traditional systems that implement ML models.

Examples of the application enable collaborative learning in a distributed, privacy-preserving manner. Particularly, the distributed devices may bring their own ML models with different architectures and without disclosing the ML models to other participant nodes. This is in contrast to traditional federated learning schemes, where the same ML model is shared with participants and each participant provides input data parameters that are trained based on private data. The traditional federated learning schemes provide data privacy, but not model heterogeneity. In the application, each participant can obfuscate its ML model and share the obfuscated ML model in a decentralized (e.g., blockchain-like) manner. The obfuscation format of the sub-model may be a procedure agreed upon in advance by various nodes in the system. Then the application generates a stacked ensemble comprising the obfuscated models that can enable the collaborative learning.

Additionally, the collaborative learning process may be applied at participant nodes under control of a blockchain network. These nodes can be referred to as "edge" systems as they may be placed at or near the boundary where the real world (e.g., user computing devices, IoT devices, or other user-accessible network devices) interacts with large information technology infrastructure. For example, autonomous ground vehicles currently include more than one computing device that can communicate with fixed server assets. More broadly, edge devices such as IoT devices in various context such as consumer electronics, appliances, or drones, are increasingly equipped with computational and network capacity. Another example includes real-time traffic management in smart cities, which divert their data to a data center. However, as described herein, these edge devices may be decentralized for efficiency and scale to perform collaborative machine learning as nodes in a blockchain network.

The distributed devices may bring their own machine learning (ML) models with different architectures and without disclosing the ML models to other participant nodes. This is in contrast to traditional federated learning schemes, where the same ML model is shared with participants and each participant provides input data parameters that are trained based on private data. In examples of the application, each participant can obfuscate its ML model and share the obfuscated ML model in a decentralized (e.g., blockchain-like) manner.

Technical improvements are realized throughout the disclosure. For example, the ML models may be trained and used at the nodes, addressing changes to input data patterns or scaling the system. Moving the model training and use closer to where the data is generated can open new opportunities to perform efficient, real-time analysis of data at the location where the data is generated, instead of having to cluster the data at data centers. Without the need to consolidate all input data into one physical location (data center or "core" of the IT infrastructure), the disclosed systems, methods, and non-transitory machine-readable storage media may reduce the time for the model to adapt to changes in environmental conditions and make more accurate predictions. Applications of the system may become truly autonomous and decentralized, whether in an autonomous vehicle context or other IoT or network-connected contexts.

In other examples, collaborative learning is achieved in a truly distributed, privacy-preserving manner. This application describes transmitting ML parameters or inferences to the participating nodes in order to help train a given ML model at the participating nodes, instead of transmitting the confidential data or ML models themselves. This can help train the ML models in a privacy preserving manner on decentralized data. The models themselves can parametric (e.g., the model summarizes the data with a set of parameters of a fixed size) or non-parametric (e.g., the model may not make assumptions about the form of the mapping function, which leave the model free to learn in any functional form from the training data with a potentially infinite number of parameters). When the model is parametric, the model may be predefined in the system (e.g., neural networks). The proposed system automatically builds a stacked ensemble and trains the ensemble using swarm learning or other machine learning method. Enabling collaborative privacy preserving learning for non-parametric models (e.g., Decision Trees, Random Forests, or SVMs) is unique.

FIG. 1 illustrates an example system of decentralized ML model-building using blockchain, according to an example implementation of the disclosure. Illustrative system 100 comprises decentralized model building network 110 with a plurality of nodes 10 in a cluster or group of nodes at a location (illustrated as first node 10A, second node 10B, third node 10C, fourth node 10D, fifth node 10E, sixth node 10F, seventh node 10G).

Plurality of nodes 10 in the cluster in decentralized model building network 110 (also referred to as a blockchain network 110) may comprise any number, configuration, and connections between nodes 10. As such, the arrangement of nodes 10 shown in FIG. 1 is for illustrative purposes only. Node 10 may be a fixed or mobile device. Examples of further details of node 10 will now be described. While only one of nodes 10 is illustrated in detail in the figures, each of nodes 10 may be configured in the manner illustrated.

Node 10 may include one or more processors 20 (interchangeably referred to herein as processors 20, processor(s) 20, or processor 20 for convenience), one or more storage devices 40, or other components.

Distributed ledger 42 may include a series of blocks of data that reference at least another block, such as a previous block. In this manner, the blocks of data may be chained together as distributed ledger 42. For example, in a distributed currency context, a plurality of exchanges may exist to transfer a user's currency into a digital or virtual currency. Once the digital or virtual currency is assigned to a digital wallet of a first user, the first user may transfer the value of the digital or virtual currency to a digital wallet of a second user in exchange for goods or services. The digital or virtual currency network may be secured by edge devices or servers (e.g., miners) that are rewarded new digital or virtual currency for verifying this and other transactions occurring on the network. After verification, the transaction from the digital wallet of the first user to the digital wallet of the second user may be recorded in distributed ledger 42, where a portion of distributed ledger 42 may be stored on each of the edge devices or servers.

In some implementations, distributed ledger 42 may provide a blockchain with a built-in fully fledged Turing-complete programming language that can be used to create "contracts" that can be used to encode arbitrary state transition functions. Distributed ledger 42 may correspond with a protocol for building decentralized applications using an abstract foundational layer. The abstract foundational layer may include a blockchain with a built-in Turing-complete programming language, allowing various decentralized systems to write smart contracts and decentralized applications that can communicate with other decentralized systems via the platform. Each system can create their own arbitrary rules for ownership, transaction formats, and state transition functions. Smart contracts or blocks can contain one or more values (e.g., state) and be encrypted until they are unlocked by meeting conditions of the system's protocol.

Distributed ledger 42 may store the blocks that indicate a state of node 10 relating to its machine learning during an iteration. Thus, distributed ledger 42 may store an immutable record of the state transitions of node 10. In this manner, distributed ledger 42 may store a current and historic state of model in model data store 44.

Model data store 44 may be memory storage (e.g., data store) for storing locally trained ML models at node 10 based on locally accessible data, as described herein, and then updated based on model parameters learned at other participant nodes 10. As noted elsewhere herein, the nature of model data store 44 will be based on the particular implementation of the node 10 itself. For instance, model data store 44 may include trained parameters relating: to self-driving vehicle features such as sensor information as it relates object detection, dryer appliance relating to drying times and controls, network configuration features for network configurations, security features relating to network security such as intrusion detection, and/or other context-based models.

Rules 46 may include smart contracts or computer-readable rules that configure nodes to behave in certain ways in relation to decentralized machine learning and enable decentralized control. For example, rules 46 may specify deterministic state transitions, when and how to elect a voted leader node, when to initiate an iteration of machine learning, whether to permit a node to enroll in an iteration, a number of nodes required to agree to a consensus decision, a percentage of voting participant nodes required to agree to a consensus decision, and/or other actions that node 10 may take for decentralized machine learning.

Stacked ensemble 48 may include rules that define an architecture for the platform. Stacked ensemble 48 may include, for example, rules for storing, obfuscating, and/or combining one or more sub-models, as well as combined output predictions (e.g., in the form of an output vector) from the one or more sub-models. The obfuscation format of the sub-model may be a procedure agreed upon in advance by various nodes in the system. Each of the sub-models may be obfuscated from the first node and transmitted to the second node in an obfuscated state. In the ensemble process, the system may learn how to best combine output predictions from two or more of the sub-models and store the sub-models or any ensembled models in model data store 44.

Processors 20 may obtain other data accessible locally to node 10 but not necessarily accessible to other nodes 10. Such locally accessible data may include, for example, private data that should not be shared with other devices but model parameters that are learned from the private data can be shared.

Processors 20 may be programmed by one or more computer program instructions. For example, processors 20 may be programmed to execute application layer 22, machine learning framework 24 (illustrated and also referred to as ML framework 24), obfuscation layer 26, interface layer 28, or other instructions to perform various operations, each of which are described in greater detail herein. As used herein, for convenience, the various instructions will be described as performing an operation, when, in fact, the various instructions program processors 20 (and therefore node 10) to perform the operation.

Application layer 22 may execute applications on the node 10. For instance, application layer 22 may include a blockchain agent (not illustrated) that programs node 10 to participate in a decentralized machine learning across blockchain network 110 as described herein. Each node 10 may be programmed with the same blockchain agent, thereby ensuring that each acts according to the same set of decentralized model building rules, such as those encoded using rules 46. For example, the blockchain agent may program each node 10 to train a sub-model using local data. Application layer 22 may execute machine learning through the ML framework 24.

ML framework 24 may train a model based on data accessible locally at node 10. For example, ML framework 24 may generate model parameters from sensor data, data aggregated from nodes 10 or other sources, data that is licensed for sources, and/or other devices or data sources to which the node 10 has access. The data may include private data that is owned by the particular node 10 and not visible to other devices. In an implementation, the ML framework 24 may use the TensorFlow™ machine learning framework, although other frameworks may be used as well. In some of these implementations, a third party framework Application Programming Interface (API) may be used to access certain model building functions provided by the machine learning framework. For example, node 10 may execute API calls to TensorFlow™ or other machine learning framework.

Application layer 22 may use interface layer 28 to interact with and participate in the blockchain network 110 for decentralized machine learning across multiple participant nodes 10. Interface layer 28 may communicate with other nodes using blockchain by, for example, broadcasting blockchain transactions and writing blocks to the distributed ledger 42 based on those transactions.

Application layer 22 may use the distributed ledger 42 to coordinate parallel model building during an iteration with other participant nodes 10 in accordance with rules 46.

ML framework 24 may train one or more ML models on private data siloes (referred to as "sub-models"). The architecture of the decentralized ML model is described in greater detail in U.S. patent application Ser. No. 16/163,159 and India Patent Application No. 201841016309, the contents of which are incorporated by reference herein.

ML framework 24 may also compile the obfuscated ML sub-models that were generated (e.g., using the private data) into a combined ML model. For example, the one or more obfuscated ML sub-models may include parametric and non-parametric models in a same combined ML model. The combined ML model may be similar to a stacked ensemble (e.g., combining the first obfuscated sub-model and the second obfuscated sub-model) and may also implement swarm learning to build a decentralized ML model. The decentralized ML model may be trained. The combination may be fully automatic by ML framework 24 to construct the stacked ensemble and train in a decentralized manner.

For example, ML framework 24 of each node 10 may train the sub-models using multiple phases. Each iteration of sub-model training (also referred to herein as machine learning, model training, or model building) may include multiple phases, such as a first and second phases. In the first phase, each node 10 trains its local sub-models independently of other nodes 10 using its local training dataset, which may be accessible locally to the node but not to other nodes. As such, each node 10 may generate sub-model parameters resulting from the local training dataset.

In the second phase, nodes 10 may each share the sub-model parameters with other nodes in the blockchain network 110. For example, each node 10 may share its sub-model parameter to a subset of nodes 10 (illustrated with FIG. 3). The subset of nodes 10 may combine the parameters from the other nodes 10 to generate final parameters and inference for the current iteration using a combinator layer. The combinator layer may comprise a trainable parametric layer, where the weights are updated during the backpropagation phase of model training. The trainable parametric layer may implement the swarm learning. The final parameters may be distributed to the other nodes 10 so that each node can update their local ML model using local training data to the node that is not accessible by other nodes 10 in the cluster.

Figure 2:
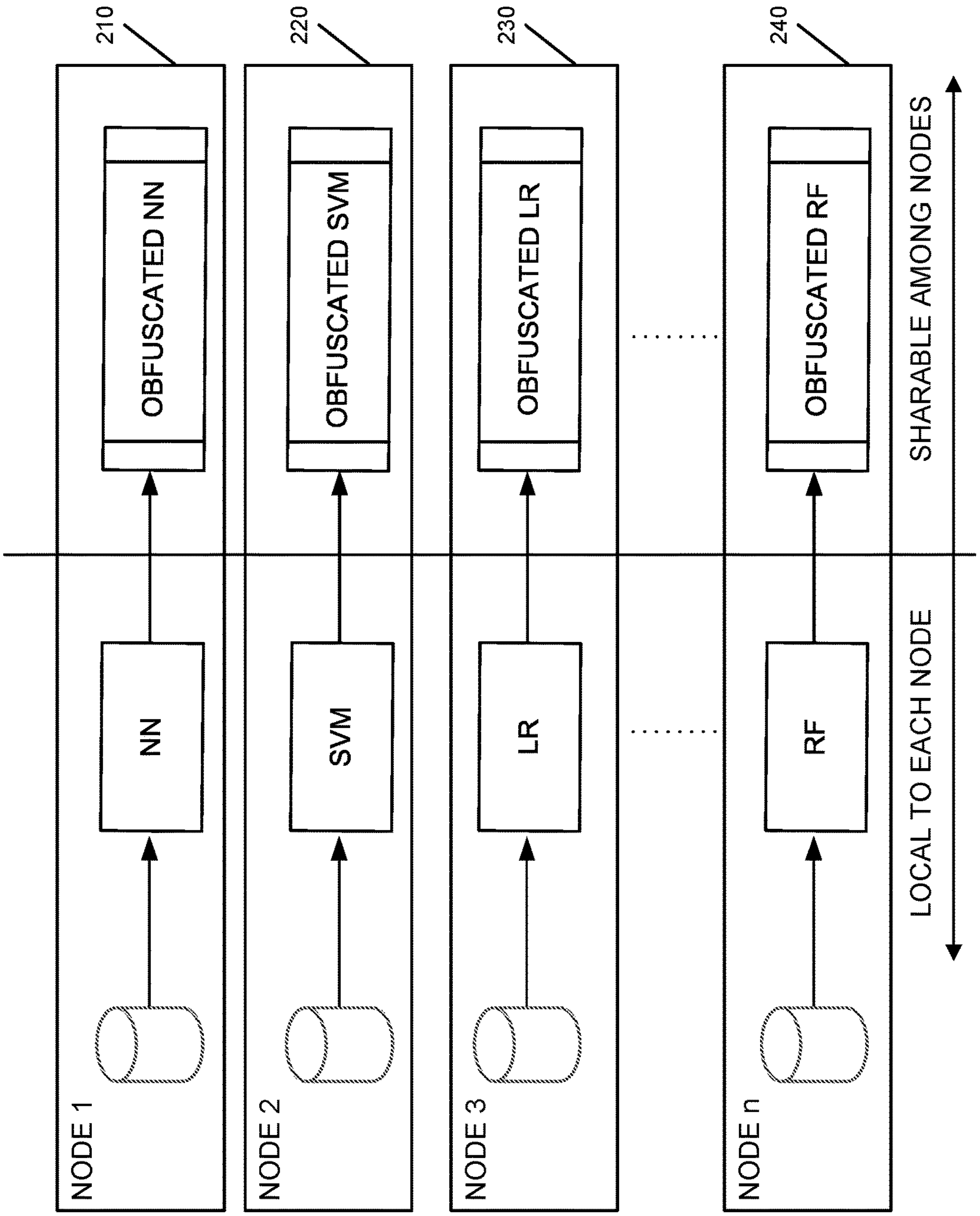
FIG. 2 illustrates nodes training sub-models, in accordance with examples of the disclosure.

Further details of distributed learning are now described with reference to FIG. 2 which illustrates a plurality of nodes that generate sub-models, in accordance with examples of the disclosure. In this illustration, nodes 10 are illustrated as first node 210 that trains and generates a neural network (NN) ML model, second node 220 that implements a support-vector machine (SVM) ML model, third node 230 that implements a logistic regression (LR) ML model, and fourth node 240 that implements a random forest (RF) ML model. The number of nodes and particular models listed herein are provided for illustrative purposes only and should not be limiting to the disclosure.

In this setup, each participant node 10 generates a sub-model as a black box function to other nodes in the network. Training performed locally at the participant node is learnt from the private data on each of the participant nodes 10. Each sub-model (e.g., NN, SVM, LR, or RF) may be built and trained locally using one or more local data sets at each node. In some examples, both the data and the sub-model may not leave the node.

Nodes 10 may each comprise different sub-models and each of the sub-models may have the same learning objective. In other words, the sub-models may be trained for the same machine learning problem. Models may differ in the architecture and its use of ML platforms to implement the model, but may solve the same ML problem.

The sub-models may have arbitrarily complex or simple architectures on their own. The arbitrarily complex architectures may, unlike state-of-art Federated learning which trains only one kind of ML model, each of nodes 10 can implement its own kind of ML model and ML framework 24 can combine several kinds of ML models. As an illustrative example, if the users are building a model to classify wines based on a set of attributes, all sub-models should do the same. One sub-model model may not mix a regression model with a classification model. This assumption can allow ML framework 24 to architect a system that combines sub-models where the individual nodes may bring in their own models and expertise in designing their local models to a collaborative learning system.

The architecture of each sub-model may also comprise the same input and output vector with some degree of confidence about the correctness of the predicted output. The use of the same input and output vectors may ensure that node 10 can compose a stacked ensemble in a deterministic way.

Each node may compile and obfuscate the sub-model to share with other nodes using obfuscation layer 26. Obfuscation layer 26 may compile and obfuscate sub-models to preserve privacy using several forms. For example, the obfuscation may compile the ML model into binary to obfuscate the model. This compilation may allow the compiled ML models to execute faster than the original sub-model generated at node 10. In another example, the obfuscation may compile the ML model using a runtime application. The runtime applications may define a common set of operators and a common file format so that the sub-model may be provided as input and an obfuscated model may be provided as output. In any of these compiled examples, regardless of the sub-model being parametric or non-parametric, either could be converted into the same runtime format (e.g., a graph representing the data flow in some compact encoded format, a compiled application into binary format, or any file format that can be run independently without needing a programmatic interpreter).

Obfuscation layer 26 can implement an obfuscation method to involve software licensing or other means of control to ensure only eligible participants can access the compiled version of the sub-models. In some examples, licensing frameworks can be incorporated to obfuscated forms of the sub-models to ensure arbitrarily complex control (e.g., ML models are "software black boxes" that can execute on generic runtime applications to allow users to compose ML models into a stacked ensemble in a privacy preserving manner).

Figure 3:
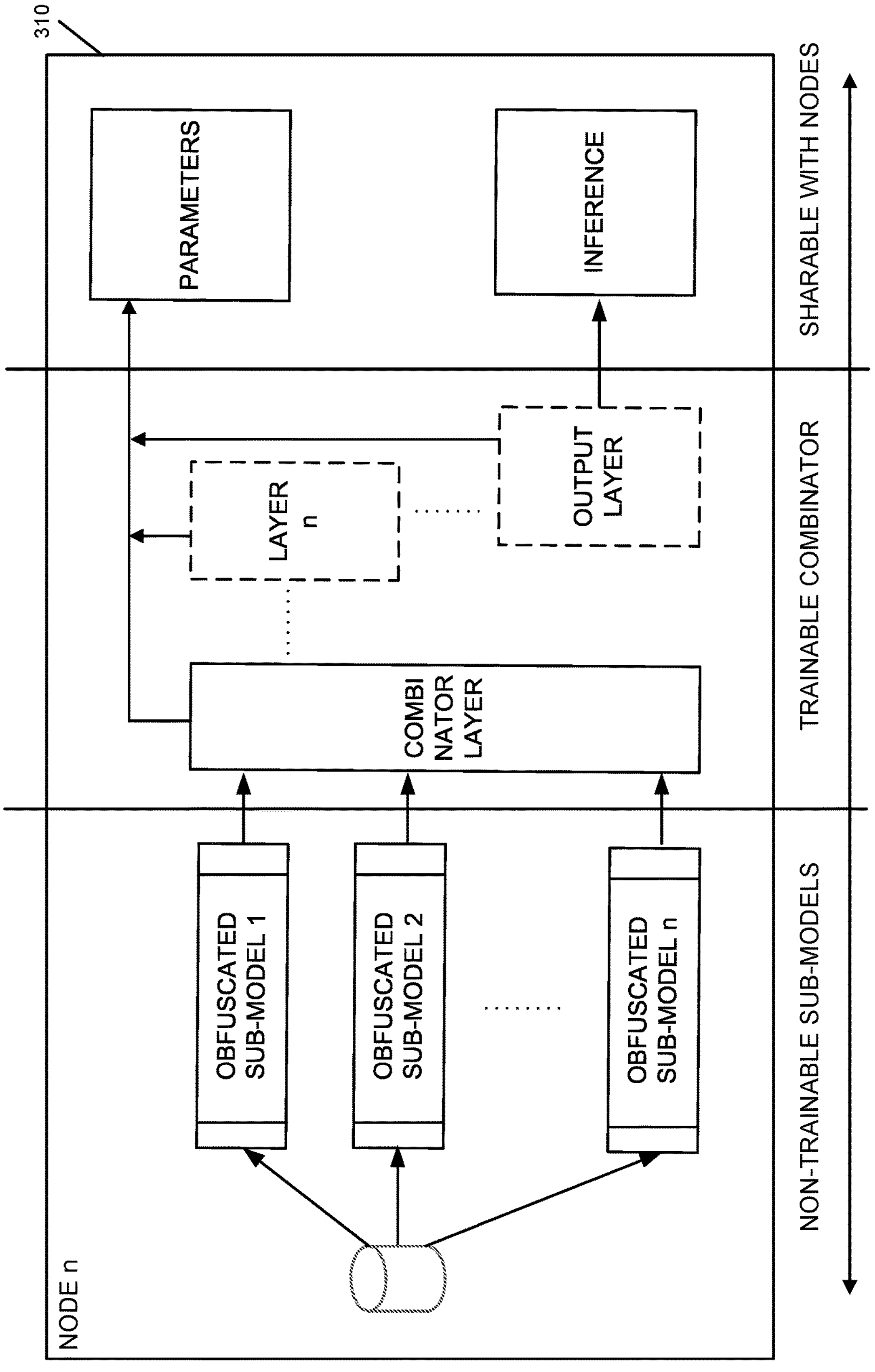
FIG. 3 illustrates combining sub-models, in accordance with examples of the disclosure.

Obfuscation layer 26 may store the obfuscated sub-model in a data store, like model data store 44. In some examples, obfuscated sub-models are frozen and non-trainable after they are stored. The non-trainable sub-models may be provided to a second node of the cluster or a subset of nodes 310 to combine the sub-models, as illustrated in FIG. 3.

For example, nodes 10 may be categorized into subsets of nodes 310, including one or more participant nodes and one or more voted leader nodes. The participant nodes may provide information to the voted leader nodes, where the voted leader nodes may combine the information and use it to create a new output. The output from the voted leader nodes may be provided back to the participant nodes, as described herein. In some examples, the participant nodes may also be a voted leader node.

Subset of nodes 310 can correspond with one or more nodes 10 that are voted or pre-designated leader nodes to receive and combine the obfuscated sub-models. Each of the original or participant nodes 10 can have the functionality to combine the obfuscated sub-models, and subset of nodes 310 or voted leader nodes may activate this functionality. In some examples, participant nodes 10 may not activate this functionality, except for subset of nodes 310 or voted leader nodes.

In some examples, participant nodes 10 may vote to select the architecture of the combinator layer. The architecture can be a custom combinator layer based on a use case proposed by one the participant nodes 10 or it may be a pre-defined parametric layer (e.g., neural network (NN), support-vector machine (SVM), or logistic regression (LR)) that is offered by the system.

Once an agreement or consensus among the nodes 10 is reached and the subset of nodes 310 is selected, the participant nodes 10 may transmit the obfuscated sub-model to each of the subset of nodes 310. Subset of nodes 310 may receive the obfuscated sub-model from the participant nodes 10.

Each of subset of nodes 310 can construct a local instance of a stacked ensemble comprising the outputs of the first obfuscated sub-model, a second obfuscated sub-model (e.g., from another node 10 in the cluster), additional obfuscated sub-models (e.g., more than two sub-models), and/or a trainable parametric layer (e.g., the combinator layer). In some examples, the input to the combinator layer is the concatenation of the outputs of the obfuscated sub-models from participant nodes 10, resulting in a combination of the sub-models. Construction of the local instance may also comprise other forms of combination (rather than concatenation), like a smart contact or rules 46, stacking the layers into a N-Dimensional matrix, implementing a function that transforms the input vectors in to large N-dimensional space, implementing a trainable function to combine the layers, predetermined composition logic, or other methods of combining layers. This can help allow the subset of nodes 310 to construct the stacked ensemble "locally" and in a decentralized manner.

Each of subset of nodes 310 can train the local instance of the stacked ensemble at the combinator layer. The training of the stacked ensemble may use outputs of the obfuscated sub-model(s) from the participant nodes 10. For example, the stacked ensemble learns to moderate the output of the input sub-models and combine the learnings from private data streams to achieve collaborative learning.

Each of subset of nodes 310 may combine the local parameters from the participant nodes 10 to generate final parameters for the iteration based on the combined local parameters. It should be noted that each of subset of nodes 310 may have itself generated local parameters from its local training dataset, in which case it may combine its local parameters with the obtained local parameters as input to the combinator layer.

In some examples, the stacked ensemble learns to moderate the output of the input sub-models and combine the learnings from private data stream to achieve collaborative learning. The combinator layer may then provide one or more parameters and inferences as output, which can be sharable with other nodes.

Additional information describing the training of the stacked ensemble using swarm learning on local private data in a decentralized manner is described in greater detail in U.S. patent application Ser. No. 16/163,159 and India Patent Application No. 201841016309, the contents of which are incorporated by reference herein.

Returning to FIG. 1, interface layer 28 may share the one or more parameters and inferences with the other participant nodes 10. The other nodes 10 can incorporate the parameters and inferences with their local ML sub-models to retrain the sub-models using the local data and updated parameters and inferences.

Interface layer 28 may include a messaging interface used to communicate via a network with other participant nodes 10. The messaging interface may be configured as a Secure Hypertext Transmission Protocol ("HTTPS") microserver.

Other types of messaging interfaces may be used as well. Interface layer 28 may use a blockchain API to make calls for blockchain functions based on a blockchain specification. Examples of blockchain functions include, but are not limited to, reading and writing blockchain transactions and reading and writing blockchain blocks to the distributed ledger 42.

Figure 4:
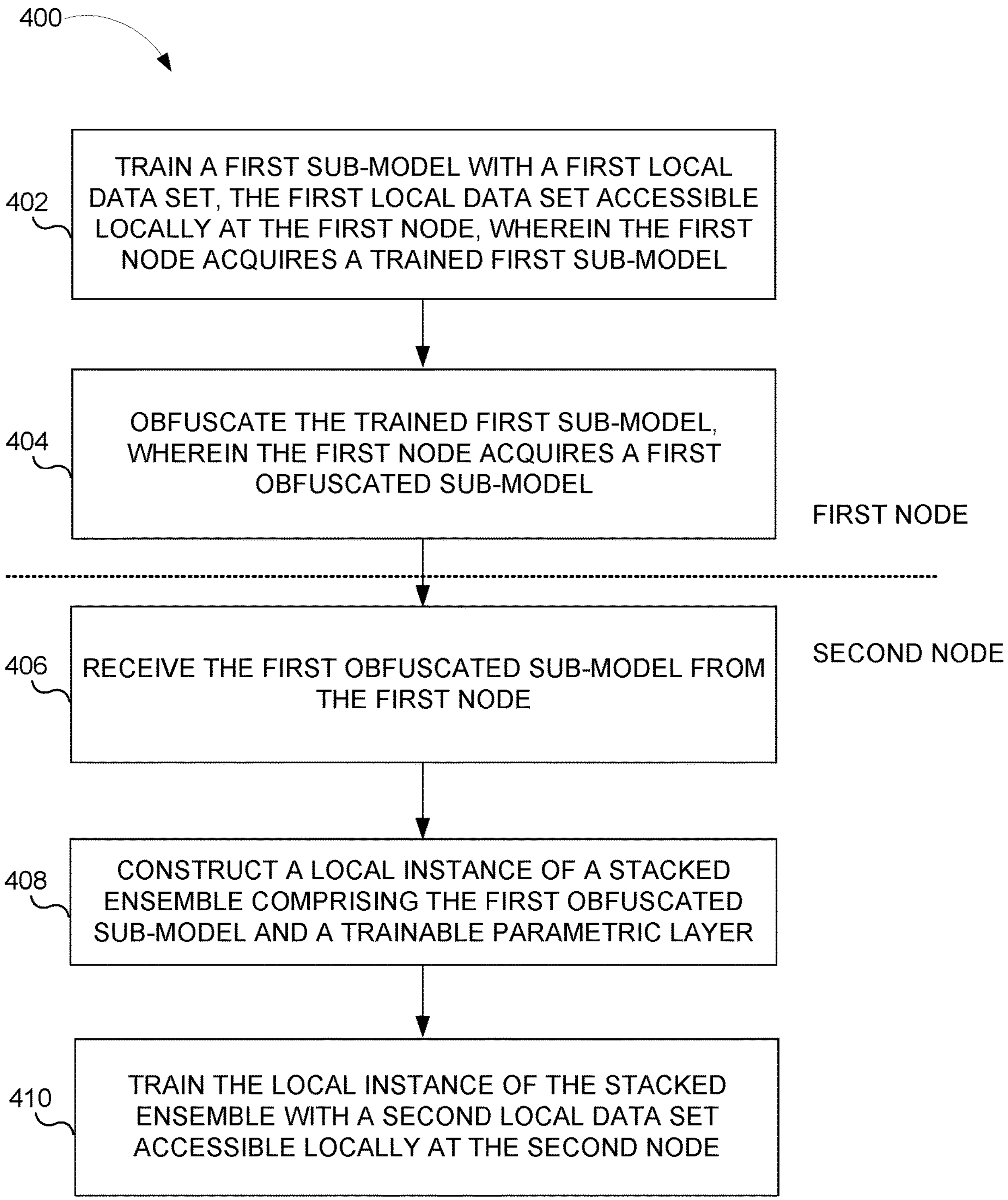
FIG. 4 is an illustrative training and combination process performed between two nodes, in accordance with examples of the disclosure.

FIG. 4 is an illustrative training and combination process performed between two nodes, in accordance with examples of the disclosure. In this illustration, a first node and a second node of a cluster of nodes is provided. The nodes illustrated may correspond with nodes 10 in FIG. 1.

At block 402, the first node may train a first sub-model with a first local data set. The first local data set may be accessible locally at the first node. The first node may acquire a trained first sub-model.

At block 404, the first node may obfuscate the trained first sub-model. The first node may acquire a first obfuscated sub-model.

At block 406, a second node may receive the first obfuscated sub-model from the first node.

At block 408, the second node may construct a local instance of a stacked ensemble. The stacked ensemble may comprise the first obfuscated sub-model and a trainable parametric layer.

At block 410, the second node may train the local instance of the stacked ensemble with a second local data set. The second local data set may be accessible locally at the second node.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
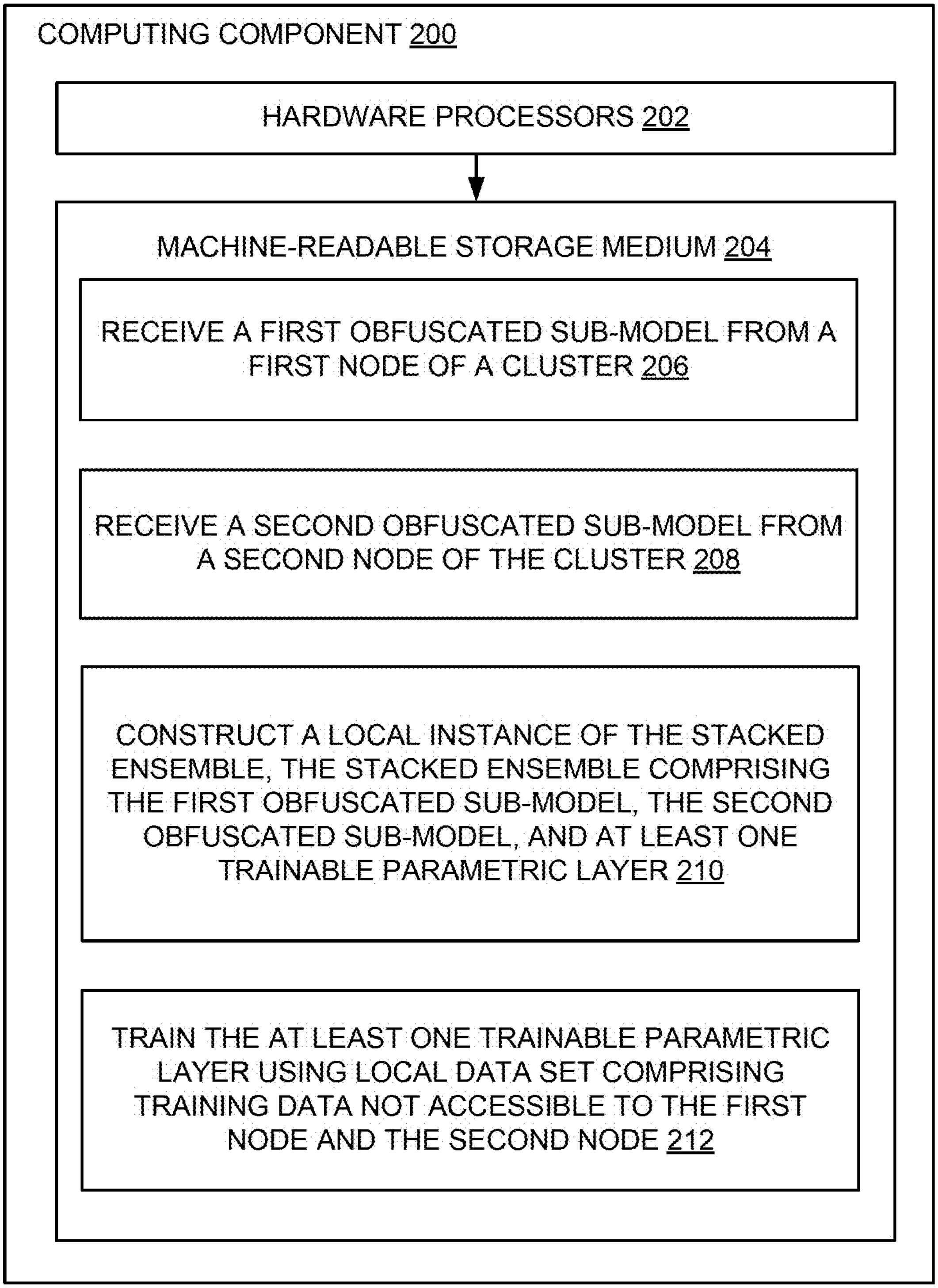
FIG. 5 is an example computing component that may be used to implement various features of examples described in the present disclosure.

FIG. 5 illustrates an example computing component that may be used to implement training heterogenous models using stacked ensembles on decentralized data in accordance with various examples. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-512, to control processes or operations for training heterogenous models using stacked ensembles on decentralized data. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512.

Hardware processor 502 may execute instruction 506 to receive a first obfuscated sub-model from a first node of a cluster.

Hardware processor 502 may execute instruction 508 to receive a second obfuscated sub-model from a second node of a cluster.

Hardware processor 502 may execute instruction 510 to construct a local instance of the stacked ensemble, the stacked ensemble comprising the first obfuscated sub-model, the second obfuscated sub-model, and at least one trainable parametric layer.

Hardware processor 502 may execute instruction 512 to train the at least one trainable parametric layer using local data set comprising training data not accessible to the first node and the second node.

Figure 6:
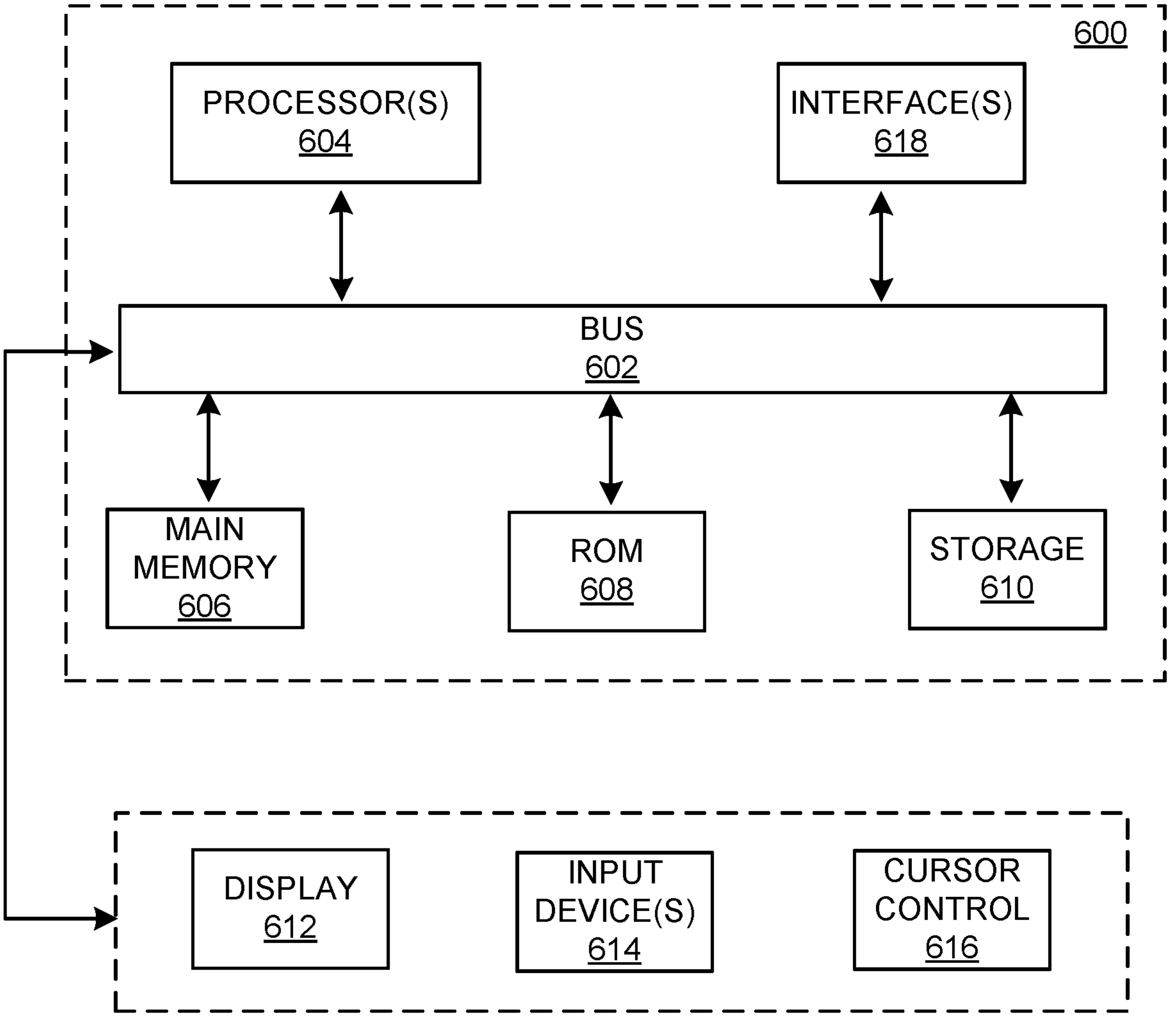
FIG. 6 depicts a block diagram of an example computer system in which various of the examples described herein may be implemented.

FIG. 6 depicts a block diagram of an example computer system 600 in which various of the examples described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word “component,” “engine,” “system,” “database,” data store,” and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term “non-transitory media,” and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes an interface(s) 618 coupled to bus 602. Interface(s) 618 provides a two-way data communication coupling to one or more network links that are connected to one or more local networks. For example, interface(s) 618 may be an integrated services digital network (ISDN) card, cable modem, satellite modem, or a modem to provide a data communication connection to a corresponding type of telephone line. As another example, interface(s) 618 may be a local area network (LAN) card to provide a data communication connection to a compatible LAN (or WAN component to communicate with a WAN). Wireless links may also be implemented. In any such implementation, interface(s) 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the “Internet.” Local network and Internet both use electrical, electromagnetic or optical signals that carry digital data streams. The signals through the various networks and the signals on network link and through interface(s) 618, which carry the digital data to and from computer system 600, are example forms of transmission media.

The computer system 600 can send messages and receive data, including program code, through the network(s), network link and interface(s) 618. In the Internet example, a server might transmit a requested code for an application program through the Internet, the ISP, the local network and the interface(s) 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a “cloud computing” environment or as a “software as a service” (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A decentralized system comprising:

a first node of the decentralized system, wherein the first node comprises:

a first processor;

a first storage device that stores first computer-readable instructions that cause the first processor to:

train a first sub-model with a first local data set, the first local data set accessible locally at the first node, wherein the first node acquires the first sub-model;

obfuscate the trained first sub-model as a first obfuscated sub-model by compiling the first sub-model using a runtime application to define a common set of operators and file format, freezing the compiled first sub-model to be non-trainable, and employing software licensing to ensure proper access eligibility to the compiled first sub-model; and add the first obfuscated sub-model to a blockchain network; and a second node of the decentralized system, wherein the second node comprises:

a second processor;

a second obfuscated sub-model trained with a second local data set;

a second storage device that stores second computer-readable instructions that cause the second processor to:

execute a contract on a distributed ledger to conduct a vote to select an architecture for a trainable parametric layer and determine, based on consensus among nodes, that an agreement has been reached for the architecture;

receive the first obfuscated sub-model from the blockchain network;

construct, in response to the consensus agreement, a local instance of a stacked ensemble comprising the first obfuscated sub-model, the second obfuscated sub-model, and a combinator layer of the first node comprising a trainable parametric layer;

train the local instance of the stacked ensemble with the second local data set accessible locally at the second node and not accessible to the first node;

add an obfuscated second sub-model generated from the local instance of the stacked ensemble to the blockchain network;

wherein the first node is further configured to:

construct, using the combinator layer of the first node, a second local instance of the stacked ensemble comprising outputs of the first obfuscated sub-model and the second obfuscated sub-model from the blockchain network, wherein the trainable parametric layer's weights are updated during a backpropagation phase of training, an input to the combinator layer of the first node being a N-Dimensional matrix formed by concatenation of outputs of the first obfuscated sub-model and the second obfuscated sub-model; and generate, using a machine learning framework of the first node, an inference based on the second local instance of the stacked ensemble with a different machine learning model architecture than the second node.

2. The decentralized system of claim 1, wherein the second node further including computer-readable instructions to:

train a second sub-model with the second local data set as a trained second sub-model, wherein the second node acquires the second sub-model;

obfuscate the trained second sub-model as a second obfuscated sub-model; and transfer the second obfuscated sub-model to the first node.

3. The decentralized system of claim 2, wherein the local instance of the stacked ensemble further comprises the second obfuscated sub-model.

4. The decentralized system of claim 2, wherein the first sub-model is a parametric model and the second sub-model is a non-parametric model.

5. The decentralized system of claim 2, wherein the first sub-model and the second sub-model share a same learning objective.

6. The decentralized system of claim 2, wherein the second node further includes computer-readable instructions to:

train the stacked ensemble with outputs of the first obfuscated sub-model and the second obfuscated sub-model.

7. The decentralized system of claim 1, wherein the first obfuscated sub-model is obfuscated by a procedure agreed upon in advance by the first node and the second node.

8. The decentralized system of claim 1, wherein the first obfuscated sub-model is non-trainable by the second node.

9. The decentralized system of claim 1, wherein the second node further includes computer-readable instructions to:

vote selection of an architecture for the trainable parametric layer;

determine that an agreement has been reached for the architecture; and based on the agreement, cause the second node to construct the stacked ensemble.

10. The decentralized system of claim 1, wherein the first node trains and generates a neural network (NN) machine learning model and the second node implements a support-vector machine (SVM) machine learning model.

11. The decentralized system of claim 1, wherein the combinator layer of the first node concatenates the first obfuscated sub-model and the second obfuscated sub-model into a N-Dimensional matrix.

12. A method of training a stacked ensemble, the method comprising:

training a first sub-model with a first local data set accessible locally at a first node of a decentralized system, obfuscating the trained first sub-model by compiling the first sub-model using a runtime application to define a common set of operators and file format, freezing the compiled first sub-model to be non-trainable, and employing software licensing to ensure proper access eligibility to the compiled first sub-model;

adding the first obfuscated sub-model to a blockchain network;

receiving the first obfuscated sub-model at a second node of the decentralized system, wherein the second node comprises a second obfuscated sub-model trained with a second local data set;

constructing, at the second node, in response to a consensus agreement for an architecture selected by a contract-executed vote on a distributed ledger, a local instance of the stacked ensemble, the stacked ensemble comprising the first obfuscated sub-model, the second obfuscated sub-model, and at least one combinator layer of the first node comprising a trainable parametric layer;

training, at the second node, the at least one trainable parametric layer using the second local data set comprising training data not accessible to the first node;

adding an obfuscated second sub-model generated from the local instance of the stacked ensemble to the blockchain network after the training;

receiving, at the first node, the obfuscated second sub-model generated from the local instance of the stacked ensemble from the blockchain network;

constructing, using the combinator layer, a second local instance of the stacked ensemble comprising outputs of the first obfuscated sub-model and the second obfuscated sub-model from the blockchain network, wherein the trainable parametric layer's weights are updated during a backpropagation phase of training, an input to the combinator layer of the first node being a N-Dimensional matrix formed by concatenation of outputs of the first obfuscated sub-model and the second obfuscated sub-model; and generating, using a machine learning framework, an inference based on the second local instance of the stacked ensemble with a different machine learning model architecture than the second node.

13. The method of claim 12, wherein the first obfuscated sub-model is associated with a parametric model and the second obfuscated sub-model is associated with a non-parametric model.

14. The method of claim 12, wherein the first obfuscated sub-model and the second obfuscated sub-model share a same learning objective.

15. The method of claim 12, wherein the first obfuscated sub-model and the second obfuscated sub-model are obfuscated by a procedure agreed upon in advance by the first node and the second node.

16. A non-transitory machine-readable storage medium comprising instructions executable by a processor, the instructions programming the processor to:

train a first sub-model with a first local data set accessible locally at a first node of a decentralized system, wherein the first node implements a first machine learning model architecture, obfuscate the trained first sub-model by compiling the first sub-model using a runtime application to define a common set of operators and file format, freezing the compiled first sub-model to be non-trainable, and employing software licensing to ensure proper access eligibility to the compiled first sub-model;

add the first obfuscated sub-model to a blockchain network;

receive the first obfuscated sub-model at a second node of the decentralized system, wherein the second node implements a second machine learning model architecture that is different than the first machine learning model architecture, and wherein the second node comprises a second obfuscated sub-model trained with a second local data set;

construct, at the second node, in response to a consensus agreement for an architecture selected by a contract-executed vote on a distributed ledger, a local instance of the stacked ensemble, the stacked ensemble comprising the first obfuscated sub-model, the second obfuscated sub-model, and at least one combinator layer of the first node comprising a trainable parametric layer;

train, at the second node, the at least one trainable parametric layer using the second local data set comprising training data not accessible to the first node;

add an obfuscated second sub-model generated from the local instance of the stacked ensemble to the blockchain network after the training;

receive, at the first node, the obfuscated second sub-model generated from the local instance of the stacked ensemble from the blockchain network;

construct, using the combinator layer, a second local instance of the stacked ensemble comprising outputs of the first obfuscated sub-model and the second obfuscated sub-model from the blockchain network, wherein the trainable parametric layer's weights are updated during a backpropagation phase of training, an input to the combinator layer of the first node being a N-Dimensional matrix formed by concatenation of outputs of the first obfuscated sub-model and the second obfuscated sub-model; and generate, using a machine learning framework, an inference based on the second local instance of the stacked ensemble with a different machine learning model architecture than the second node.

17. The non-transitory machine-readable storage medium of claim 16, wherein the first node and the second node are nodes in the blockchain network of the decentralized system, wherein the agreement is based on consensus of blockchain logic.

18. The non-transitory machine-readable storage medium of claim 16, wherein the at least one trainable parametric layer is a custom layer proposed by the first node based on a use case.

19. The non-transitory machine-readable storage medium of claim 16, wherein the at least one trainable parametric layer is a predefined parametric layer.

20. The non-transitory machine-readable storage medium of claim 16, wherein the first obfuscated sub-model is associated with a parametric model and the second obfuscated sub-model is associated with a non-parametric model.

* * * * *